United States Patent
Frenger et al.

(10) Patent No.: US 9,647,776 B2
(45) Date of Patent: May 9, 2017

(54) METHOD AND NETWORK NODES FOR CALIBRATING UPLINK MEASUREMENTS

(71) Applicant: Telefonaktiebolaget L M Ericsson (publ), Stockholm (SE)

(72) Inventors: Pål Frenger, Linköping (SE); Erik Eriksson, Linköping (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 79 days.

(21) Appl. No.: 14/400,112

(22) PCT Filed: Jul. 2, 2014

(86) PCT No.: PCT/SE2014/050834
§ 371 (c)(1),
(2) Date: Nov. 10, 2014

(87) PCT Pub. No.: WO2016/003335
PCT Pub. Date: Jan. 7, 2016

(65) Prior Publication Data
US 2016/0006523 A1    Jan. 7, 2016

(51) Int. Cl.
*H04B 17/10* (2015.01)
*H04B 17/309* (2015.01)
(Continued)

(52) U.S. Cl.
CPC ......... *H04B 17/104* (2015.01); *H04B 7/0619* (2013.01); *H04B 17/309* (2015.01); *H04W 24/10* (2013.01); *H04W 36/0094* (2013.01)

(58) Field of Classification Search
None
See application file for complete search history.

(56) References Cited

U.S. PATENT DOCUMENTS

2010/0290381 A1* 11/2010 Gu .................. H04W 52/146
                                                                  370/311
2014/0162718 A1*  6/2014 Li .................. H04W 52/146
                                                                  455/522

FOREIGN PATENT DOCUMENTS

CN         102149123 A      8/2011
EP           1954091 A2      8/2008
(Continued)

*Primary Examiner* — Anh Ngoc Nguyen
(74) *Attorney, Agent, or Firm* — Murphy, Bilak & Homiller, PLLC

(57) ABSTRACT

The present disclosure relates to a method (50) for calibrating uplink measurements performed in a wireless network (10) comprising two or more network nodes (12, 13, 14, 15) providing wireless communication for communication devices (16). The method (50) comprises obtaining (51) a node specific calibration offset, $E_i$, for each of at least two of the two or more network nodes (12, 13, 14), and calibrating (52) uplink measurements performed by each of the at least two of the two or more network nodes (12, 13, 14) by adding to the uplink measurements made by the respective network node (12, 13, 14) the respective node specific calibration offset, $E_i$. The disclosure also relates to a wireless network, method in first network node, first network node, computer programs and computer program products.

31 Claims, 6 Drawing Sheets

(51) Int. Cl.
*H04B 7/06* (2006.01)
*H04W 24/10* (2009.01)
*H04W 36/00* (2009.01)

(56) References Cited

FOREIGN PATENT DOCUMENTS

| | | | |
|---|---|---|---|
| EP | 2720487 | A1 | 4/2014 |
| WO | 0051389 | A1 | 8/2000 |
| WO | 2013127480 | A1 | 9/2013 |
| WO | 2014030065 | A2 | 2/2014 |
| WO | 2014032271 | A1 | 3/2014 |

\* cited by examiner

METHOD AND NETWORK NODES FOR CALIBRATING UPLINK MEASUREMENTS

TECHNICAL FIELD

The technology disclosed herein relates generally to the field of wireless communication and in particular to methods and network nodes for calibrating uplink measurements.

BACKGROUND

Recent advancement in antenna technology is expected to enable increasingly advanced antennas to be deployed in cellular radio networks. Antennas that are re-configurable in terms of beam-shape, so called re-configurable antenna systems (RAS) are already in use. Beam-forming and communication device beam-tracking is also gaining momentum. Further still, it is expected that large antennas comprising several hundreds individually controlled antenna elements will become available in near future.

Advanced antenna solutions are very promising but they also bring a set of new difficulties that will need to be addressed. A difficulty that may arise when the network nodes use antenna devices of different types is that uplink measurements made by different network nodes may give misleading results when compared, since the accuracy of the measurements may depend on the respective network node's antenna capabilities.

There may also be large systematic errors that are not accounted for when producing the measurements.

Further, calibration of e.g. antennas and receiving (RX) circuitry in a network node for obtaining accurate measurements is time-consuming and costly. Such calibration involves e.g. personnel going out to the site with measurement and calibration equipment. The calibration efforts may increase with the advancement degree of the antennas.

Calibration errors still further aggravates the comparisons of uplink measurements made by different network nodes by adding varying degree of calibration related errors to the measurements.

SUMMARY

An object of the present disclosure is to solve or at least alleviate at least one of the above mentioned problems.

The object is according to a first aspect achieved by a method for calibrating uplink measurements which may be performed in a wireless network comprising two or more network nodes providing wireless communication for communication devices. The method comprises obtaining a node specific calibration offset for each of at least two of the two or more network nodes; and calibrating uplink measurements performed by the at least two network nodes of the two or more network nodes by adding to the uplink measurements made by the respective network node the respective node specific calibration offset.

The method enables measurements that are performed by different network nodes to be automatically calibrated. This enables improved support for advanced antenna solutions including e.g. uplink based mobility measurements without the need for expensive and time consuming calibration processes.

The object is according to a second aspect achieved by a wireless network for calibrating uplink measurements. The wireless network comprises two or more network nodes providing wireless communication for communication devices. The wireless network is configured to: determine a node specific calibration offset for each of at least two of the two or more network nodes, and calibrate the uplink measurements performed by each of at least two of the two or more network nodes by adding to the uplink measurements made by the respective network node the respective node specific calibration offset.

The object is according to a third aspect achieved by a method performed in a first network node for calibrating uplink measurements, the first network node providing wireless communication for communication devices of a wireless network. The method comprises obtaining a node specific calibration offset and calibrating uplink measurement values by adding the obtained node specific calibration offset.

The object is according to a fourth aspect achieved by a first network node of a wireless network comprising two or more network nodes providing wireless communication for communication devices. The first network node is configured to obtain a node specific calibration offset and calibrate uplink measurement values by adding the obtained node specific calibration offset.

The object is according to a fifth aspect achieved by a computer program comprising computer program code for causing a first network node to perform the method as above, when the computer program code is executed on a processor of the first network node.

The object is according to a sixth aspect achieved by a computer program product comprising a computer program as described above, and a computer readable means on which the computer program is stored.

Further features and advantages of the present disclosure will become clear upon reading the following description and the accompanying drawings.

DETAILED DESCRIPTION

Figure 1:
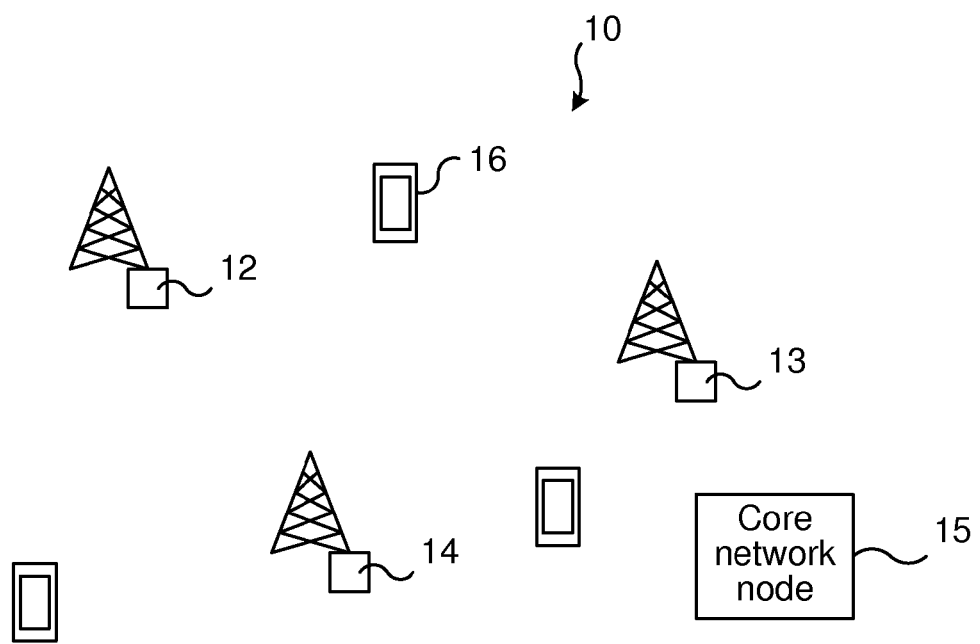
FIG. 1 illustrates schematically an environment in which embodiments of the present disclosure may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present disclosure provides a method for automatic calibration of multi-node (uplink) measurements in a wireless network. A node specific offset is calculated for each node based for instance on measurements made by communication devices, post-handover rate, and/or handover events to a third node shortly after handover to a target node.

FIG. 1 illustrates schematically an environment in which embodiments of the present disclosure may be implemented. A wireless network 10, e.g. an LTE network, comprises a number of network nodes 12, 13, 14, enabling communication devices 16 to communicate over wireless links. Such network nodes 12, 13, 14 may be denoted in different ways, e.g. radio access node, base station, radio base station, evolved node B (eNB) etc. Also the communication devices 16 may be denoted differently, e.g. mobile station, wireless device, user equipment (UE), etc. The communication device 16 may comprise e.g. a smart phone, a tablet etc. In the following the communication device is referred to as UE.

The network nodes 12, 13, 14 enable UEs 16 to communicate wirelessly. To this end, the network nodes 12, 13, 14 each provide communication coverage in one or more geographical area(s), denoted cells. The network nodes 12, 13, 14 may comprise antenna systems and receiver and transmitter signal processing that are rather advanced. For example, they may use beamforming, wherein transmission weights may be added for each antenna element to match a channel to the UE 16. Such transmission weights may e.g. be in the form of an antenna element combination matrix. Thereby the received signal energy may be improved.

The wireless network 10 typically comprises various other network nodes, such as Mobility Management Entity (MME), or operation and maintenance (O&M) nodes, packet data network gateways, mobility management entities, serving gateways etc. Such other network nodes are collectively and schematically illustrated as core network node with reference numeral 15.

An aspect of the present disclosure will be described next with reference to FIG. 2. Before comparison of node measurement values from different nodes are made, each measurement value is calibrated by adding a node specific offset $E_i$ to the measurement value. This gives automatically calibrated measurement values $Z_i$ according to:

$$Z_i = Y_i + E_i,$$

wherein $Z_i$ is a calibrated measurement value for a node i, $Y_i$ is an un-calibrated measurement value from the node i, and $E_i$ is the node specific offset E for the node i. The node specific offsets $E_i$ may be seen as calibration related correction factors and are in the following also denoted simply offset $E_i$ or calibration factor.

The calibrations according to the above may be performed in one or more network nodes, e.g. base stations. In particular, as illustrated at reference numeral 21, a number M of measurements $X_{n,1}, X_{n,2}, \ldots, X_{n,M}$ related to node n (n= 1, ..., N) are received from different nodes and may be used as a basis for determining the node specific offsets $E_i$ for the different nodes in relation to node n. For instance, a first network node wanting to use calibrated measurement values may receive measurements $X_{n,1}, X_{n,2}, \ldots, X_{n,M}$ from different network nodes, e.g. its neighboring network nodes, wherein the measurements $X_{n,1}, X_{n,2}, \ldots, X_{n,M}$ are related to this first network node. It is noted that some measurements may relate to different cells controlled by node n, if the node n serves users in several geographical areas. The output of box 21 is thus a number of offsets $E_1, E_2, \ldots, E_N$, i.e. an offset $E_i$ for each node i in relation to node n. This is illustrated by the ellipse encircling the output from box 21 and indicated by "Node-individual calibration offsets". For example, node n may receive two measurements from one particular node and then determine, based thereon, the node specific offset E for this particular node. An outer loop measurement calibration may be used, wherein feedback values are used and incremental updates a performed to a control value. As a particular example, the offsets may be updated each time a handover has been performed for a UE to a certain cell: if the handover decision was a "good" decision, e.g. improving the channel quality for the UE, then the offset may be decreased, while if the handover decision was a "bad" decision, e.g. the UE is immediately performing another handover, then the offset may be increased. As illustrated at reference numeral 22, a network node, e.g. the first network node as exemplified above, may receive un-calibrated measurement values $Y_1, Y_2, \ldots, Y_N$ from N other nodes (indicated by "Un-calibrated multi-node measurements" in the FIG. 2). When receiving such measurements $Y_1, Y_2, \ldots, Y_N$ the node, already having a calibration offset $E_i$ for each node from which it receives the measurements, the node can now correct the received measurement values by adding the respective calibration offset to the respective measurement value. Continuing the above example, since the node at hand already has an offset E for the particular node from which it receives the measurement value(s), it simply corrects the received measurement value(s) by adding the specific offsets E for this particular node. The output from box 22 is thus calibrated measurement values $Z_1, Z_2, \ldots, Z_N$ from multiple nodes.

From the above description, it is clear that each network node may calculate offsets for all or its neighboring nodes and apply the offsets when receiving measurement reports from the neighboring nodes. It is noted that each node may alternatively estimate its own offset and correct measurement values before sending them. The offset calculations may, as a further alternative, be performed in a separate node, e.g. core network node, which then provides the offsets to all network nodes in use thereof.

The determination in box 21 can be performed in different ways. In particular, the individual node specific offsets $E_i$ may be calculated based for instance on one or more of the following input parameters:

Downlink measurements from one or more UEs 16 on a reference signal transmitted from cell i (denoted $X_i$); and/or Uplink measurements in cell i on reference signals transmitted from one or multiple UEs, j, denoted $Y'_{i,j}$; and/or Post-handover user performance related to a particular UE in the target cell i (denoted $R_i$); and/or Handover events in time window after initial handover.

In an embodiment, an uplink measurement performed in a node i may be compared with a UE measurement on a reference signal transmitted from the node i. The node i may receive such UE measurement in a measurement report from the UE. Assume that e.g. the path-loss, which is the difference in received power and transmitted power, is estimated, i.e. that the path-loss is the measurement value. The difference between the pathloss estimated by the UE (measurement value X) and the pathloss estimated by the node i (measurement value Y) may be expressed as $\Delta=Y-X$. This difference $\Delta$ is ideally equal to zero (for a particular wireless channel) and deviations from zero may thus be used as a measure on calibration errors. By filtering or averaging such measurements performed by many different UEs on the node i an estimate of a suitable correction factor, i.e. offset Ei, to use for this node i may be obtained.

In another embodiment, a UE measurement $X_i$ may be used to estimate a post-handover rate $R'_i=f(X_i)$ using a mapping function f(.) and compare that with the actual post-handover reported rate $R_i$ for the same UE from node i. The mapping function may for example be based on expected Signal-to-Interference-plus-Noise-Ratio (SINR) and the load in the cell. The mapping function may be derived for instance based on measurements and/or simulations. By averaging or filtering the error values $\Delta_i = R_i - R'_i$ a suitable value of $E_i$ can be obtain for use in calibration of future measurements received from node i.

Further, handover event(s) to a third cell shortly after a first handover to cell i may be used to adjust the value of $E_i$ that was used in order to calculate the first handover decision variable $Z_i$. For instance, if a user after having been handed over to cell i and is shortly after this handover again handed over, now to cell k, the value of $E_i$ may be adjusted such that a handover to cell i becomes less frequent (assumedly being a "bad" handover decision). Further $E_k$ may also be adjusted so as to make handover to cell k more frequent (assumedly being a better handover decision).

In another embodiment, the correction factor $E_i$, may be calculated based on the relative difference between the received uplink reference signal transmitted from UE j and measured in cell A, $Y'_{A,j}$, and cell B, $Y'_{B,j}$, compared to the relative difference in downlink measurements for the UE j on reference signals transmitted from A ($X_A$) and B ($X_B$), i.e.:

$$\Delta_j = (Y'_{B,j} - Y'_{A,j}) + (X_A - X_B)$$

Ideally, the uplink difference ($Y'_{B,j} - Y'_{A,j}$) is equal to zero, as is the downlink difference, i.e. ($X_A - X_B$). Adding these two differences may thus give an indication on calibration error in a network node serving these two cells, and hence the offset $E_i$ may be set equal to $\Delta_j$.

In some embodiments the measurement values Y' may be different from the uplink measurement values Y used for mobility. In one example, Y' may be calculated using a different receiver signal processing than when calculating Y. For example, Y' may be calculated using a receiver signal processing based on the transmitter signal processing used for the reference signal measured in cell X while Y represent a different, more UE specific receiver processing. An example of this embodiment is described more in detail with reference to FIG. 3. In some embodiments, filtering is applied on each update where the resulting offset is a combination of multiple measurements on multiple UEs.

Calculations of offset values can be performed in a distributed fashion where each base station 12, 13, 14 estimates its own calibration and reports already calibrated measurement values to other nodes. In other embodiments, the calibration may be done in a separate centralized node, e.g. an operation, maintenance and management (OMM) node. In still other embodiments, each base station 12, 13, 14 may calculate calibration offsets for all of its neighbors and a respective calibration offset may be applied on reports received from the nodes.

Figure 3:
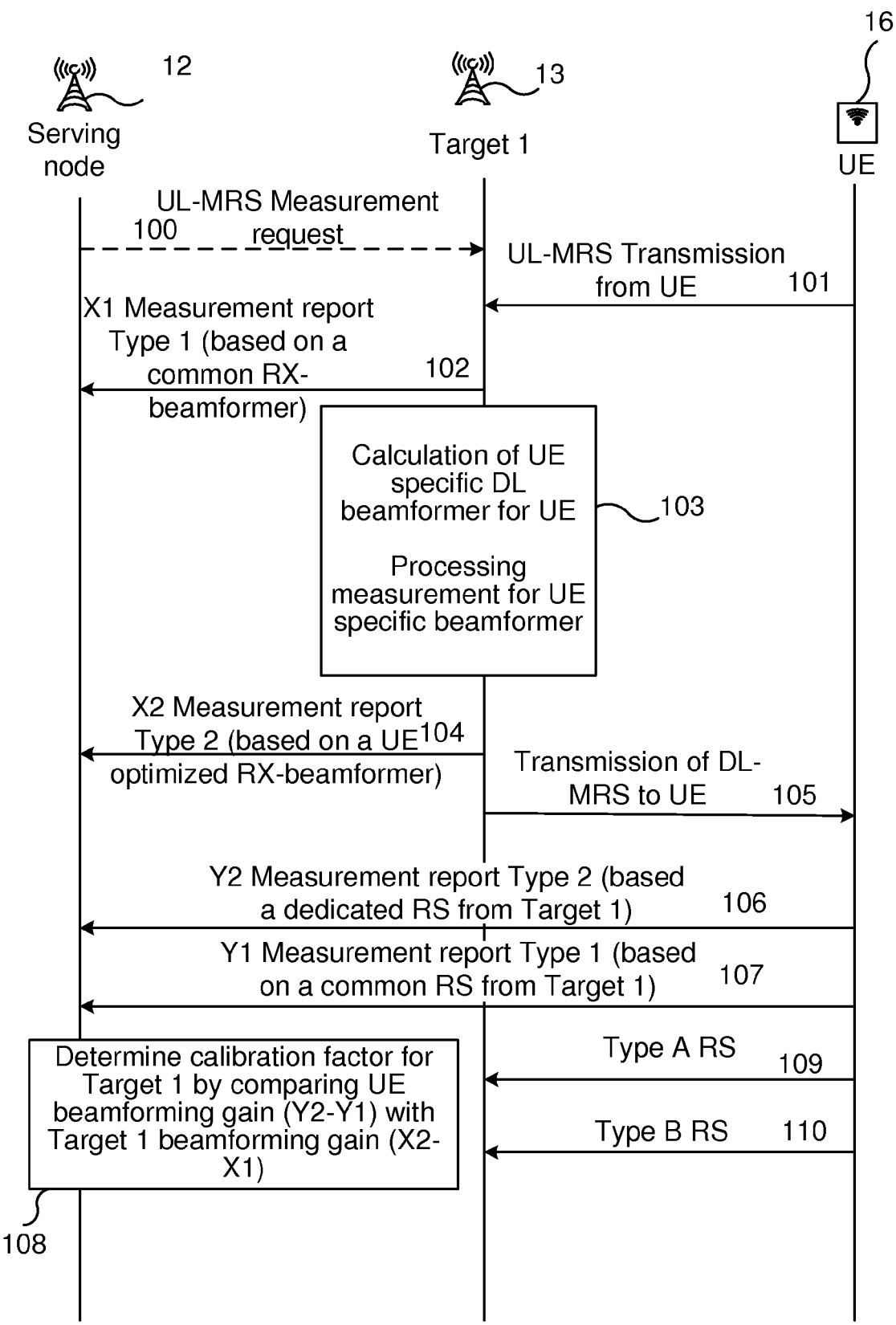
FIG. 3 is a sequence diagram illustrating signaling according to an embodiment of the present disclosure.

FIG. 3 is a sequence diagram illustrating an embodiment on how to provide the input needed to calculate the calibration offsets $E_i$. Briefly, a non-serving node 13 (indicated as Target 1 in FIG. 3) performs and reports two different measurements on an uplink reference signal transmitted from a particular communication device UE 16.

At arrow 101, the non-serving node 13 receives a reference signal, e.g. an uplink mobility reference signal (UL-MRS), from the UE 16 and measures on it. For this first measurement (Type 1) the non-serving node 13 may use a common receiver beamformer, i.e. the receiver beamformer not being adapted in any particular way for receiving the signal from this particular communication device UE 16. The receiver signal processing of the non-serving node 13 is thus not adapted in any way for the particular communication device UE 16. For example, antenna weights that are used for downlink broadcasted signals, e.g. mobility signals, may be used for receiving this UL-MRS. As another example, an identity matrix may be used as antenna element combination matrix for this measurement. Using an identity matrix results in that the transmission weights are equal for all antenna elements, thus not adapted for the channel between the UE and the non-serving node 13.

The UL-MRS measurement may have been preceded by a request (arrow 100) sent from the serving node 12 to the non-serving node, requesting the non-serving node 13 to perform an uplink mobility reference signal measurement for the particular UE 16.

Next, the non-serving node 13 reports this first UL-MRS measurement, of Type 1, to the serving node 12. That is, at arrow 102, the non-serving node 13 sends a measurement report based on the performed measurement to the serving node 12 serving the UE 16. This measurement report of Type 1 may, as indicated in the FIG. 3, be based on using a common receiver (RX)-beamformer. Such sending may be performed using an inter-node interface such as $X_1$.

For the other measurement (Type 2) the non-serving node 13 may calculate and use a receiver beamformer that is adapted for this particular UE 16, for example optimized for this UE 16. At box 103 thus, the non-serving node 13 calculates a UE specific beamformer for the UE 16 and receives and processes the UL-MRS sent from the UE 16 by using the calculated receiver beamformer. This is indicated in the figure as "Processing measurement for UE specific beamformer".

At arrow 104, the non-serving node 13 reports also this to the serving node 12. This measurement report of Type 2 may, as indicated in the FIG. 3, be based on using a UE optimized receiver (RX)-beamformer. Such sending may also be performed using an inter-node interface such as X1.

Two measurements (Type 1 and Type 2) are hence reported to the serving node 12 that is serving the UE 16. The serving node 12 thus receives a first measurement report (Type 1), based on a common receiver beamformer. This first measurement report is denoted X1. The serving node 12 also receives a second measurement report (Type 2), based on a UE specific downlink transmission. This second measurement report is denoted X2.

At arrow 105, the non-serving node 13 may transmit a downlink reference signal, e.g. a downlink mobility reference signal (DL-MRS) for the UE 16 to measure on. This DL-MRS may be adapted for the UE 16, e.g. in box 103 the non-serving node 13 may also determine UE specific downlink (DL) beamformer adapted for the UE 16. The non-serving node 13 may thus transmit the DL-MRS adapted for this particular UE 16.

At arrow 106, the UE 16 sends a measurement report to its serving node 12 based on the UE specific downlink transmission, i.e. the DL-MRS adapted for the UE, from the non-serving node 13. This DL-MRS adapted for the UE may be seen as dedicated reference signals (RS). This report is denoted Y2. The UE 16 also sends a measurement report to its serving node 12 based on common reference signals sent from the non-serving node 13 (arrow 107). This report is denoted Y1.

The UE 16 may thus measure and report on a common reference signal transmitted from the non-serving node 13 as well as on a UE specific downlink reference signal transmitted from non-serving node 13, where the reference signal transmission weights have been calculated for this particular UE 16.

At box 108, the serving node 12 now has measurement reports X1, X2, Y1, Y2 enabling it to determine a calibration factor for use on future measurement reports received from this non-serving node 13. In particular, the offset E to the non-serving node 13 may be determined by comparing beamforming gain for the UE 16 with the beamforming gain for the non-serving node 13. In particular, the UE beamforming gain may be calculated as the difference Y2−Y1, and the non-serving node beamforming gain may be calculated as the difference X2−X1. Ideally, these differences are equal, i.e. (Y2−Y1)=(X2−X1), and the offset E may be set to E=(Y2−Y1)+(X2−X1). Any further measurement reports that the serving node 12 receives from this non-serving node 13 may thus be calibrated by adding the offset E.

It is noted that there are still further alternatives in case the UE 16 can perform transmission beamforming as well. In that case the UE 16 may transmit a non-beam-formed reference signal (Type A) on which the non-serving node 13 performs both a Type 1 and a Type 2 measurements (denoted Type 1-A and Type 2-A respectively). The transmission of such Type A reference signal (RS) from the UE 16 is illustrated in FIG. 3 at arrow 109. The UE 16 may also transmit an uplink reference signal (Type B) with a transmission beamforming optimized for the non-serving node 13 on which the non-serving node 13 performs measurements when using a common receiver beamformed (Type 1-B) as well as a UE optimized receiver beamformed (Type 2-B). The transmission of such Type B reference signal (RS) from the UE 16 is illustrated in FIG. 3 at arrow 110.

Thus for the uplink there are at least 4 different measurements that can be performed (Type 1-A, 2-A, 1-B, and 2-B) and obviously there are also at least 4 corresponding measurements that can be performed in the downlink. For one radio relation (UE to neighboring node, e.g. the non-serving node 13) there are thus 8 different types of measurements that could potentially be performed and utilized in order to calculate measurement calibration factors as described above. In most cases there would be no need for performing all such measurements, but it is noted that the present disclosure encompasses all such different measurement, and is thus not limited to using any particular set of uplink (UL), downlink (DL), transmitter (TX), receiver (RX) beamformers.

Figure 2:
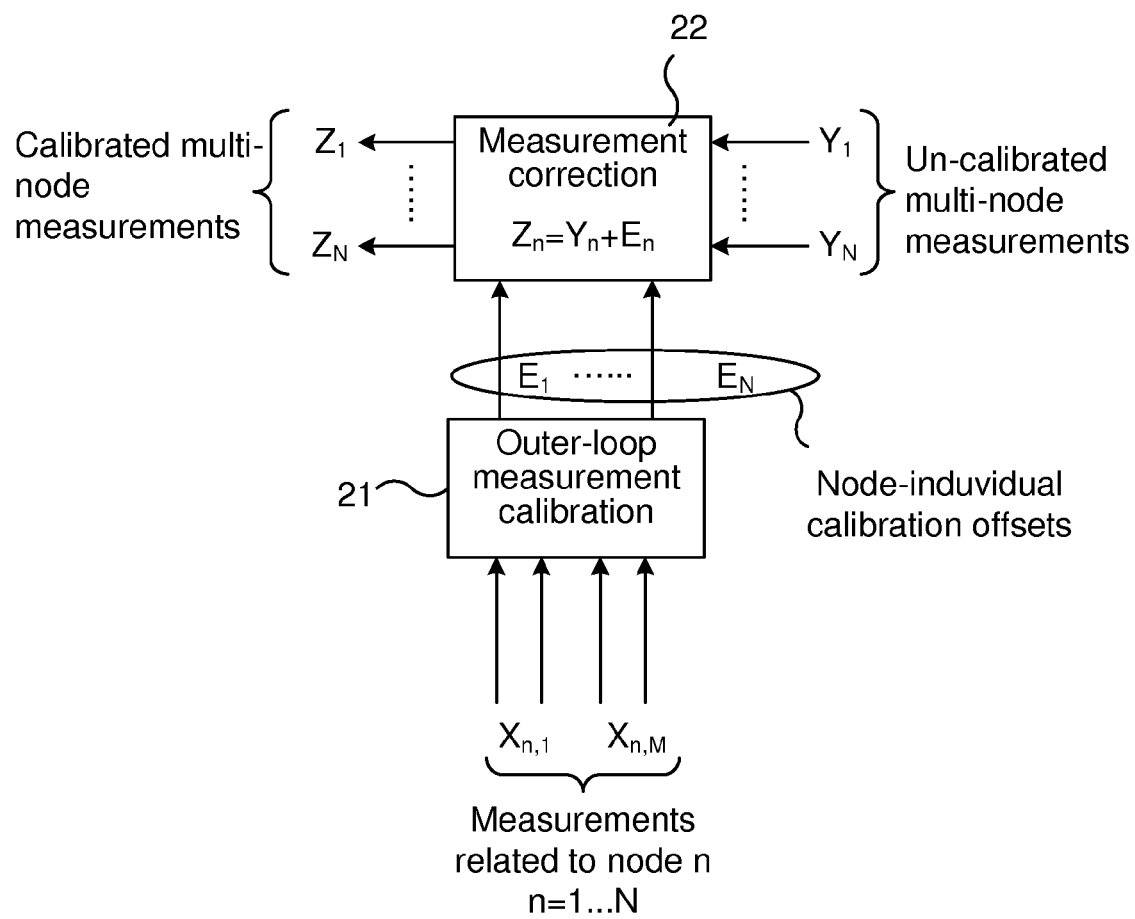
FIG. 2 illustrates principles of the present disclosure.

It is also noted that the particular calculations based on which to obtain the offset $E_i$ are just for illustrative purposes, and the offsets $E_i$ may be determined in numerous other ways, as exemplified earlier e.g. in relation to FIG. 2.

Figure 4:
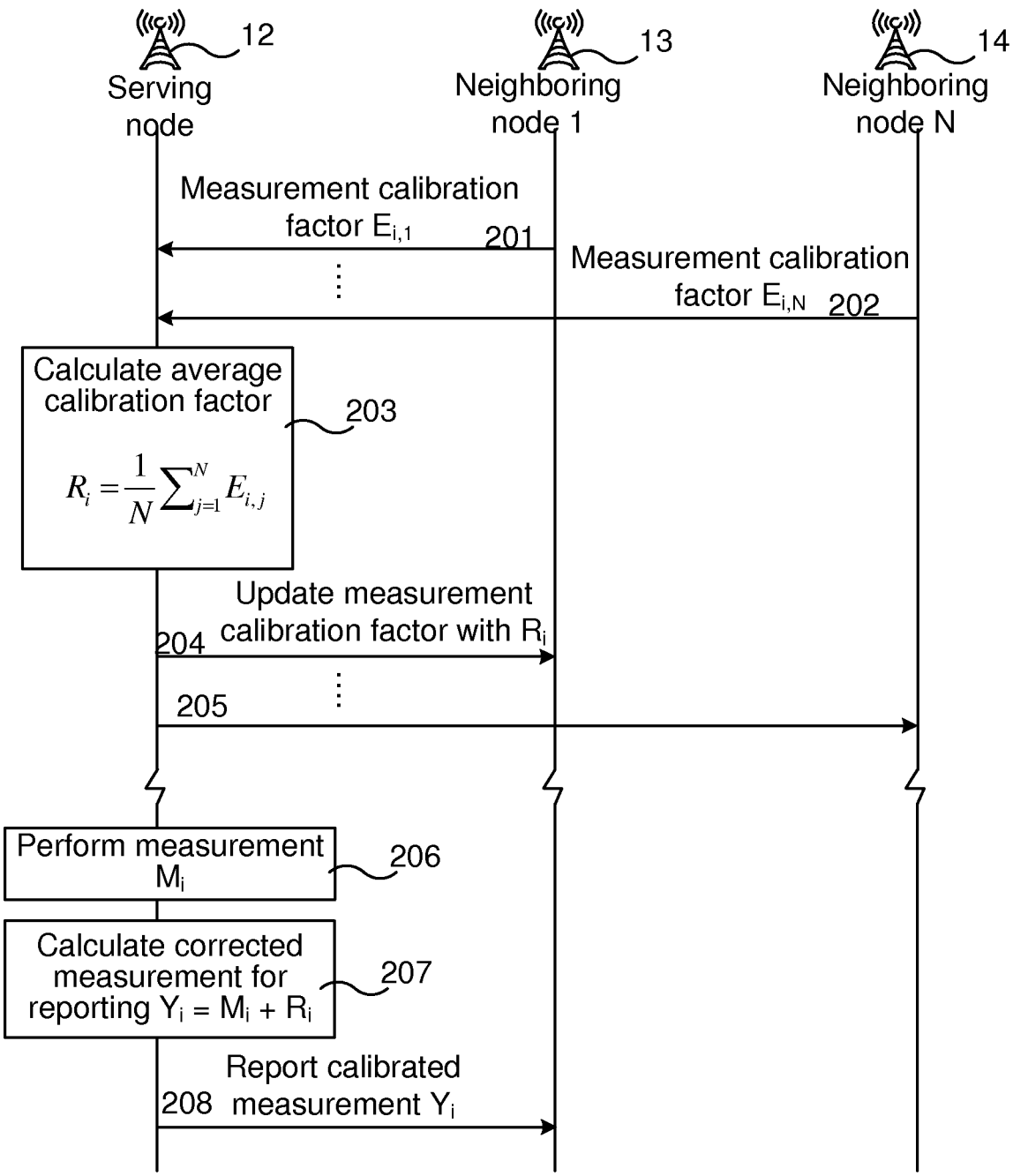
FIG. 4 is a sequence diagram illustrating signaling according to an embodiment of the present disclosure.

In FIG. 4 is a sequence diagram illustrating an embodiment of the present disclosure. In this embodiment, network nodes 12, 13, 14 inform each other about the respective measurement calibration factors that they have estimated for themselves. This enables the measurement calibration to be performed in the node that actually performs the measurements instead of the node that receives and uses the measurements (as in the embodiment described in relation to FIG. 3).

At arrow 201, a first network node 12, denoted serving node 12 in the figure, receives a measurement calibration factor, i.e. offset $E_{i,1}$, from a first neighboring network node 13, denoted Neighboring node 1 in the FIG. 4. At arrow 202, the first network node 12 receives a measurement calibration factor, i.e. offset $E_{i,N}$, from a N:th network node 14, denoted Neighboring node N in the FIG. 4. Each network node has thus calculated its own calibration factor and conveys them to the first network node 12.

At box 203, the first network node 12, may calculate an average calibration factor based on the received offsets $E_{i,j}$, j=1, . . . , N e.g. according to:

$$R_i = \frac{1}{N}\sum_{j=1}^{N} E_{i,j}$$

At arrows 204, 205 the first network node 12 sends an updated measurement calibration factor, i.e. $R_i$ above, to all network nodes from which it received offsets $E_{i,j}$.

When the first network node 12 is to perform a measurement and report it to one of the other network nodes 13, 14, it first corrects the measurement value. That is, at box 206, the first network node 12 performs a measurement $M_i$. At box 207, the first network node 12 calculates a corrected measurement value $Y_i$ for reporting: $Y_i = M_i + R_i$. At arrow 208, the first network node 12 reports the already calibrated measurement value $Y_i$ to another network node. For example, a first neighboring network node 13 may have requested the first network node 12 to perform measurements on a particular UE. The first network node 12 is, by means of the present disclosure, able to send measurement reports with an increased accuracy, enabling e.g. a more accurate handover decision to be made by the first neighboring network node 13.

As mentioned earlier and exemplified by the embodiments of FIGS. 3 and 4, the calculations of the offsets $E_i$ may be performed in the network node needing the measurements, e.g. for making a handover decision for a particular UE 16. This network node then determines calibrations factors, i.e. the offsets $E_i$, to candidate target nodes in order to improve the accuracy of the measurements on which to base the handover decision. The calculations of the offsets E may alternatively be performed in each network node, so that each network node estimates its own calibration errors, i.e. determines the offset $E_i$, and always reports calibrated measurement values to other network nodes. In still another embodiment, all calculations are done in a separate node, which receives measurement values from all network nodes and determines offsets $E_i$.

The calibration offsets $E_i$ may be calculated during a start-up period and then be repeated if a need for it is detected, e.g. if detecting that measurement values are starting to differ between network nodes. In other scenarios, the calibration offsets $E_i$ may be calculated on a regular basis, or even continuously for each measurement reporting.

Figure 5:
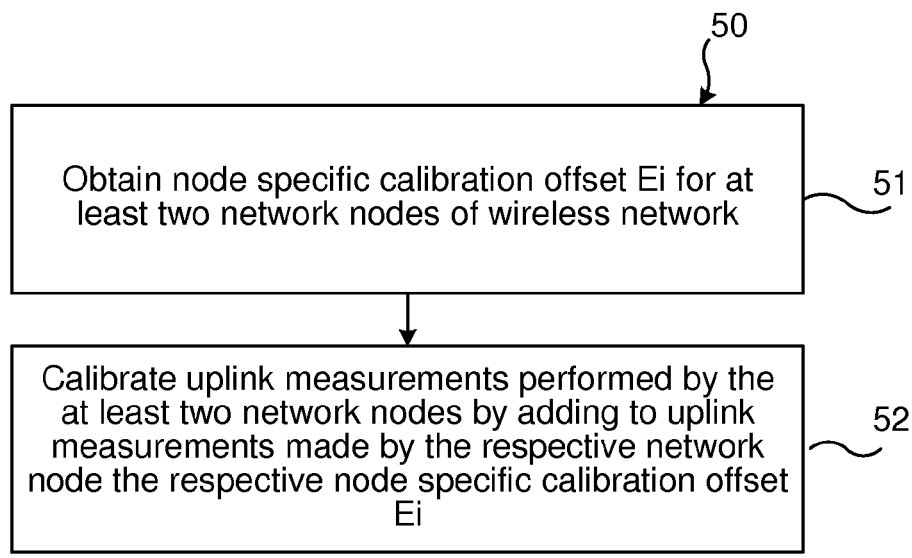
FIG. 5 illustrates a flow chart over steps of a method in a wireless network in accordance with the present disclosure.

It is noted that a network node may be the serving network node for some UEs while being a target network node for other UEs. A serving node is a node towards which a UE has a connection, and for instance control signaling is typically performed between the UE and its serving node. A target node may be a node towards which the UE has a signal strength high enough for the UE to perform downlink measurements and possibly initiate a handover to, e.g. if the signal strength towards the target node becomes better than the signal strength towards the currently serving node. The network nodes 12, 13, 14 are all typically serving nodes for some UEs and target nodes for others. In the following, a node may be denoted first network node or second network node, depending on context, the denotation "first network node" typically being used for indicating that a node is the serving network node for a particular UE, and "second network node" typically being used for indicating a node that is a target node for this UE. The various features of the present disclosure that have been described can be combined in different ways, examples of which are given in the following. FIG. 5 illustrates a flow chart over steps of a method 50 in a wireless network 10 in accordance with the present disclosure.

The method 50 for calibrating uplink measurements may be performed in a wireless network 10 comprising two or more network nodes 12, 13, 14, 15 providing wireless communication for communication devices 16. The method 50 comprises obtaining 51 a node specific calibration offset, for each of at least two of the two or more network nodes 12, 13, 14. The obtaining 51 may for instance be performed by receiving a node specific calibration offset, $E_i$, for each of at least two of the two or more network nodes 12, 13, 14. The obtaining 51 may alternatively be performed by calculating a node specific calibration offset, $E_i$, for each of at least two of the two or more network nodes 12, 13, 14.

The method 50 comprises calibrating 52 uplink measurements performed by the at least two network nodes of the two or more network nodes 12, 13, 14 by adding to the uplink measurements made by the respective network node 12, 13, 14 the respective node specific calibration offset, $E_i$.

In various embodiments, the obtaining 51 comprises calculating a node specific calibration offset, $E_i$, for each of at least two of the two or more network nodes 12, 13, 14 based on one or more of: downlink measurement reports received from one or more communication devices 16, the downlink measurement reports being based on reference signals transmitted from the respective network node 12, 13, 14, uplink measurements in the respective network node 12, 13, 14 on reference signals from one or more communication devices 16, post-handover user performance related to a particular communication device in a target network node 13, 14 and handover events within a time period after an initial handover of a communication device 16. The node specific calibration offsets may be based on different combinations of the above examples, or based on a single one of the examples.

In an embodiment, the obtaining 51 comprises:
receiving, in a second network node 13, uplink reference signals from a communication device 16 by using a receiver beamformer 63 adapted for the communication device 16, and measuring of the received uplink reference signals providing a first measurement value,
receiving, in the second network node 13, the uplink reference signals from the communication device 16 by using the receiver beamformer 63 non-beamformed and thus not adapted for the communication device 16, and measuring of the received uplink reference signals, providing a second measurement value,
transmitting, to a first network node 12, the first and second measurement values,
receiving, in the first network node 12, a first measurement report from the communication device 16 based on dedicated reference signals sent from the first network node 12,
receiving, in the first network node 12, a second measurement report from the communication device 16 based on common reference signals sent from the first network node 12,
determining, in the first network node 12, a beam forming gain of the receiver beamformer 63 based on the first and second measurement values,
determining, in the first network node 12, a corresponding beam forming gain of the communication device 16 based on the first and second measurement reports received from the communication device 16, and
determining, in the first network node 12, the node specific calibration offset, $E_1$, for the second network node 13 to be the difference between the beam forming gain of the receiver beamformer 63 and the beam forming gain of the communication device 16.

In a variation of the above embodiment, the method 50 comprises:
using, in the first network node 12, the determined node specific calibration offset $E_1$ for correcting measurement values received from the second network node 13.

In an embodiment, the obtaining 51 comprises, for each of the at least two of the two or more network nodes 12, 13, 14:
estimating, in a network node 12, 13, 14, a first measurement value based on uplink reference signals received from the communication device 16,
estimating, in the network node 12, 13, 14, a second measurement value based on measurement reports from the communication device 16, the measurement reports comprising measurement values on downlink reference signals, and
determining, in the network node 12, 13, 14, the node specific calibration offset, $E_i$, for the network node 12, 13, 14 to be the difference between a first measurement value of the first measurement report and a corresponding second measurement value of the second measurement report.

In a variation of the above embodiment, the method 50 comprises sending the node specific calibration offset, $E_i$, to one or more network nodes 12, 13, 14.

In variations of the above two embodiment, the method 50 comprises repeating, for one or more communication devices, the estimating of a first measurement value and a second measurement value and the determining, and wherein the obtained differences between the first and second measurement values are filtered or averaged.

In an embodiment, the obtaining 51 comprises:
estimating a post-handover rate for the communication device 16, for handovers made after handover from a first network node 12, and calculating the difference between the estimated post-handover rate with a reported post-handover rate for the communication device 16, and
determining the node specific calibration offset, $E_1$, for the first network node 12 to be an average or filtering of the calculated differences for two or more communication devices 16.

In an embodiment, the obtaining 51 comprises:
determining a first difference to be the difference between measurements on uplink reference signals from a communication device 16 as received in two cells,
determining a second difference to be the difference in a first and second downlink measurement report received from the communication device 16, the first downlink measurement report being based on reference signals transmitted in the first cell, and a second downlink measurement report being based on reference signals transmitted in the second cell,
determining the node specific calibration offset, $E_i$, for the network node 12, 13, 14 to be the sum of the first difference and the second difference.

In an embodiment, the method 50 comprises comparing an uplink measurement performed for the communication device 16 in one of the at least two of the two or more network nodes 12 with a corrected corresponding uplink measurement performed for the communication device 16 in the remaining network nodes 13, 14 of the two or more network nodes 12, 13, 14 and making a mobility decision based on the comparison.

In an embodiment, the method 50 comprises:
receiving, in a first network node 12, a respective node specific offset $E_i$ from one or more of the remaining network nodes 13, 14 of the two or more network nodes 12, 13, 14 of the wireless network 10, and calculating, in the first network node 12, based on the received node specific offsets $E_i$ an average offset $E_{avg}$, and updating the determined node specific offset $E_i$ for the two or more network nodes 12, 13, 14 with the average offset $E_{avg}$, by sending from the first network node 12 the calculated average offset $E_{avg}$ to the one or more of the remaining network nodes 13, 14.

In an embodiment, the obtaining 51 a node specific calibration offset, $E_i$, for each of two or more network nodes 12, 13, 14 is performed regularly or upon detecting a difference between uplink reference signals from a communication device 16 received in two network nodes 12, 13 deviating from a difference in downlink measurement reports from the communication device 16 received in the two network nodes 12, 13 by more than a threshold value.

In an embodiment, the method 50 is performed in each of the network nodes 12, 13, 14 providing wireless communication for communication devices 16, and wherein the obtaining 51 comprises:
determining the node specific calibration offset, $E_i$, for each of its neighboring network nodes 12, 13, 14, or
receiving, from a core network node, the node specific calibration offsets, $E_i$, for all of the two or more network nodes 12, 13, 14, or
determining the node specific calibration offset, $E_i$, for itself and receiving from each of its neighboring network node 12, 13, 14 their respective node specific calibration offset, $E_i$.

Figure 6:
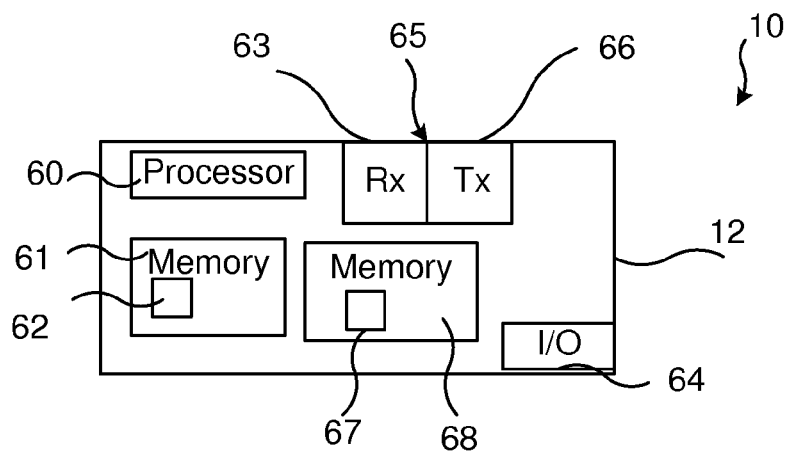
FIG. 6 illustrates schematically a wireless network and means for implementing methods of the present disclosure.
Figure 6:
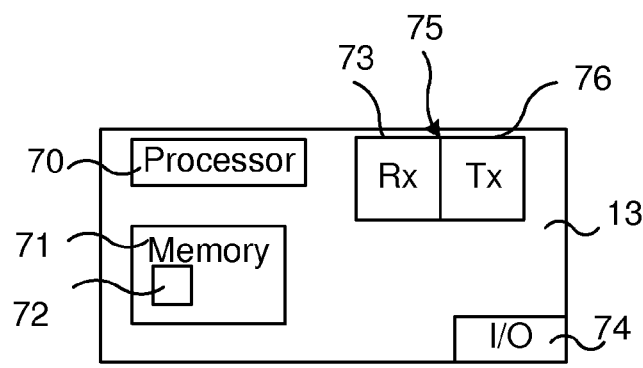

FIG. 6 illustrates schematically a wireless network 10 and means for implementing methods of the present disclosure.

The method 60 may be performed in all or a subset of all network nodes of the wireless network 10. In FIG. 6 two such network nodes 12, 13 are illustrated, but as they may be identical the following description is applicable separately for each network node 12, 13.

The network node 12, 13 comprises transceiver unit 65, 75 for wireless communication with communication devices 16. The transceiver unit 65, 75 may comprise processing circuitry for processing signals transmitted and received by the transceiver unit. The transceiver unit 65, 75 may further comprise a transmitter and a receiver both coupled to antennas, such transmitter and receiver using known radio processing and signal processing components and techniques. The transceiver unit 65, 75 may comprise a receiver beamformer as illustrated at reference numeral 63, 73 and a transmitter beamformer as illustrated at reference numeral 66, 76.

The network node 12, 13 comprises an interface device or input/output device 64, 74 for communicating with other network nodes, for example with each other. The communication may for example be a wired communication. An example of an interface by means of which two network nodes may communicate comprises X2 interface.

A data memory (not illustrated) may also be provided in each network node 12, 13 for reading and/or storing data during execution of software instructions in the processor 60, 70. The data memory may for instance be any combination of read and write memory (RAM) and read only memory (ROM).

The network node 12, 13 comprises a processor 60, 70 comprising any combination of one or more of a central processing unit (CPU), multiprocessor, microcontroller, digital signal processor (DSP), application specific integrated circuit etc. capable of executing software instructions stored in a memory 61, 71, which can thus be a computer program product 61, 71. The processor 60, 70 can be configured to execute any of the various embodiments of the method as described herein, for instance in relation to FIG. 5. The network node 12, 13 may be configured such e.g. by comprising a processor 60, 70; and one or more memories 61, 71 storing instructions that, when executed by the processor 60, 70, causes the network node 12, 13 to perform the steps of the various embodiments. The various steps of the method 50 may be performed in different network nodes 12, 13, e.g. a first step being performed in a first network node and a second step being performed in a second network node. However, each network node 12, 13 is preferably configured to be able to perform all steps. For example, a network node may be a serving node for one UE and a target node for another UE, and depending e.g. on its role, it may need to perform certain steps if being the serving node and other steps if being the target node.

A wireless network 10 is provided for calibrating uplink measurements, the wireless network 10 comprising two or more network nodes 12, 13, 14 providing wireless communication for communication devices 16. The wireless network 10 is configured to:
obtain a node specific calibration offset, $E_i$, for each of at least two of the two or more network nodes 12, 13, 14, and
calibrate the uplink measurements performed by each of at least two of the two or more network nodes 12, 13, 14 by adding to the uplink measurements made by the respective network node 12, 13, 14 the respective node specific calibration offset, $E_i$.

In an embodiment, the wireless network 10 is configured to obtain by calculating a node specific calibration offset, $E_i$, for each of the two or more network nodes 12, 13, 14 based on one or more of: downlink measurement reports received from one or more communication devices 16, the downlink measurement reports being based on reference signals transmitted from the respective network node 12, 13, 14, uplink measurements in the respective network node 12, 13, 14 on reference signals from one or more communication devices 16, post-handover user performance related to a particular communication device in a target network node 13, 14 and handover events within a time period after an initial handover of a communication device 16.

In an embodiment, the wireless network is configured to obtain by:
receiving, in a second network node 13, uplink reference signals from a communication device 16 by using a receiver beamformer 63 adapted for the communication device 16, and measuring of the received uplink reference signals providing a first measurement value,
receiving, in the second network node 13, the uplink reference signals from the communication device 16 by using the receiver beamformer 63 non-beamformed and thus not adapted for the communication device 16, and measuring of the received uplink reference signals, providing a second measurement value,
transmitting, to a first network node 12, the first and second measurement values, receiving, in the first network node 12, a first measurement report from the communication device 16 based on dedicated reference signals sent from the first network node 12, receiving, in the first network node 12, a second measurement report from the communication device 16 based on common reference signals sent from the first network node 12, determining, in the first network node 12, a beam forming gain of the receiver beamformer 63 based on the first and second measurement values, determining, in the first network node 12, a corresponding beam forming gain of the communication device 16 based on the first and second measurement reports received from the communication device 16, and determining, in the first network node 12, the node specific calibration offset, $E_1$, for the second network node 13 to be the difference between the beam forming gain of the receiver beamformer 63 and the beam forming gain of the communication device 16.

In an embodiment, the wireless network is configured to use, in the first network node 12, the determined node specific calibration offset $E_1$ for correcting measurement values received from the second network node 13.

In an embodiment, the wireless network 10 is configured to obtain by, for each of the at least two of the two or more network nodes 12, 13, 14:

estimating, in a network node 12, 13, 14, a first measurement value based on uplink reference signals received from the communication device 16, estimating, in the network node 12, 13, 14, a second measurement value based on measurement reports from the communication device 16, the measurement reports comprising measurement values on downlink reference signals, and determining, in the network node 12, 13, 14, the node specific calibration offset, $E_i$, for the network node 12, 13, 14 to be the difference between a first measurement value of the first measurement report and a corresponding second measurement value of the second measurement report.

In a variation of the above embodiment, the wireless network 10 s configured to send the node specific calibration offset, $E_i$, to one or more network nodes 12, 13, 14.

In an embodiment, the wireless network 10 is configured to repeat, for one or more communication devices, the estimating of a first measurement value and a second measurement value and the determining, and wherein the obtained differences between the first and second measurement values are filtered or averaged.

In an embodiment, the wireless network 10 is configured to obtain by:

estimating a post-handover rate for the communication device 16, for handovers made after handover from a first network node 12, and calculating the difference between the estimated post-handover rate with a reported post-handover rate for the communication device 16, and determining the node specific calibration offset, $E_1$, for the first network node 12 to be an average or filtering of the calculated differences for two or more communication devices 16.

In an embodiment, the wireless network 10 is configured to obtain by:

determining a first difference to be the difference between measurements on uplink reference signals from a communication device 16 as received in two cells, determining a second difference to be the difference in a first and second downlink measurement report received from the communication device 16, the first downlink measurement report being based on reference signals transmitted in the first cell, and a second downlink measurement report being based on reference signals transmitted in the second cell, determining the node specific calibration offset, for the network node 12, 13, 14 to be the sum of the first difference and the second difference.

In an embodiment, the wireless network 10 is configured to:

receive, in a first network node 12, a respective node specific offset $E_i$ from one or more of the remaining network nodes 13, 14 of the two or more network nodes 12, 13, 14 of the wireless network 10, and calculate, in the first network node 12, based on the received node specific offsets $E_i$ an average offset $E_{avg}$, and update the determined node specific offset $E_i$ for the two or more network nodes 12, 13, 14 with the average offset $E_{avg}$, by sending from the first network node 12 the calculated average offset $E_{avg}$ to the one or more of the remaining network nodes 13, 14.

In an embodiment, each of the at least two of two or more network nodes 12, 13, 14 providing wireless communication for communication devices 16 is configured according to any of the above embodiments, and configured to determine by:

determining the node specific calibration offset, $E_i$, for each of its neighboring network nodes 12, 13, 14, or receiving, from a core network node, the node specific calibration offsets, $E_i$, for all of the two or more network nodes 12, 13, 14 or determining the node specific calibration offset, $E_i$, for itself and receiving from each of its neighboring network node 12, 13, 14 their respective node specific calibration offset, $E_i$.

Still with reference to FIG. 6, the at least two network nodes 12, 13 of the wireless network 10 may comprise one or more memories 61, 71. The memory 61, 71 can be any combination of read and write memory (RAM) and read only memory (ROM), Flash memory, magnetic tape, Compact Disc (CD)-ROM, digital versatile disc (DVD), Blueray disc etc. The memory 61, 71 may also comprise persistent storage, which, for example, can be any single one or combination of magnetic memory, optical memory, solid state memory or even remotely mounted memory.

The present disclosure also encompasses computer program 62, 72 comprising computer program code for causing the wireless network 10 to perform the method as described herein, e.g. as described above in relation to FIG. 5 when the computer program code is executed on at least one processor 60, 70 of the wireless network 10.

The present disclosure also encompasses a computer program product 61, 71 comprising a computer program 62, 72 as described above, and a computer readable means on which the computer program 62, 72 is stored.

Figure 7:
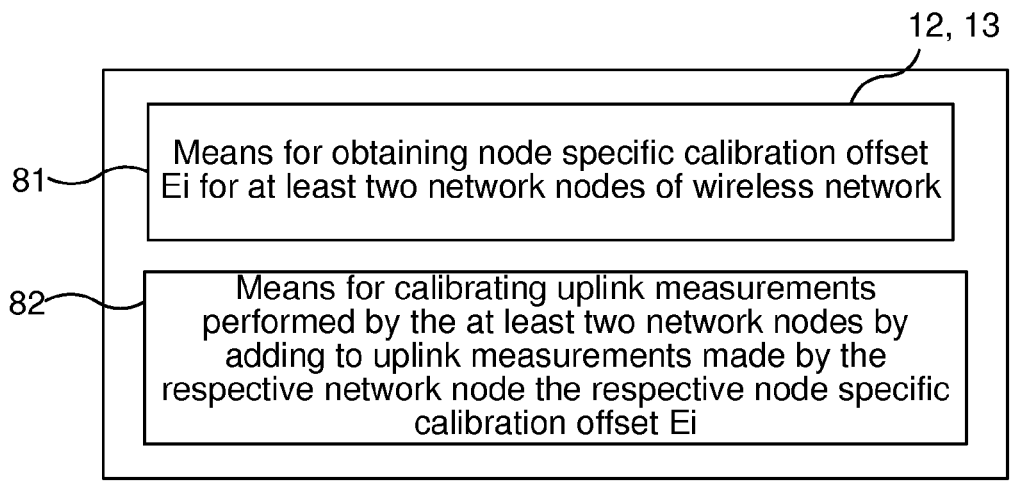
FIG. 7 illustrates a wireless network comprising function modules/software modules for implementing methods of the present disclosure.

An example of an implementation using function modules/software modules is illustrated in FIG. 7, in particular illustrating a network node 12, 13 of a wireless network 10 comprising at least two such network nodes 12, 13. Each of the at least two network nodes 12, 13 comprises function modules and/or software modules for implementing embodiments of the method 50.

Each network node 12, 13 of the wireless network 10 may comprise first means 81, for example a first function module, for obtaining a node specific calibration offset, $E_i$, for each of the at least two network nodes. Such means may comprise processing circuitry, adapted to obtain node specific calibration offsets, e.g. calculating them, using program code stored in memory.

Each network node 12, 13 of the wireless network 10 may comprise second means 82, for example a second function module, for calibrating uplink measurements performed by each of the at least two of the two or more network nodes 12, 13, 14 by adding to the uplink measurements made by the respective network node 12, 13, 14 the respective node specific calibration offset. Such means may comprise processing circuitry, adapted to obtain node specific calibration offsets, e.g. calculating them, using program code stored in memory.

Each network node 12, 13 of the wireless network 10 may comprise yet additional means for performing the steps of the various embodiments of the method. For example, each network node 12, 13 of the wireless network 10 may comprise means for calculating a node specific calibration offset, $E_i$, for each of the at least two network nodes 12, 13 based on one or more of: downlink measurement reports received from one or more communication devices 16, the downlink measurement reports being based on reference signals transmitted from the respective network node 12, 13, 14, uplink measurements in the respective network node 12, 13, 14 on reference signals from one or more communication devices 16, post-handover user performance related to a particular communication device in a target network node 13, 14 and handover events within a time period after an initial handover of a communication device 16. Such means may comprise processing circuitry, adapted to calculate node specific calibration offsets using program code stored in memory.

Each network node 12, 13 of the wireless network 10 may comprise means for:
receiving uplink reference signals from a communication device 16 by using a receiver beamformer 63, 73 adapted for the communication device 16, and measuring of the received uplink reference signals providing a first measurement value. Such means may for example comprise processing circuitry, receiving signaling from the communication device 16 via antenna(s) and transceiver circuitry,
receiving the uplink reference signals from the communication device 16 by using the receiver beamformer 63, 73 non-beamformed and thus not adapted for the communication device 16, and measuring of the received uplink reference signals, providing a second measurement value,
transmitting the first and second measurement values,
receiving a first measurement report from the communication device 16 based on dedicated reference signals sent from the network node,
receiving a second measurement report from the communication device 16 based on common reference signals sent from another network node 12,
determining a beam forming gain of the receiver beamformer 63, 73 based on the first and second measurement values.

Each network node 12, 13 of the wireless network 10 may comprise means for determining a corresponding beam forming gain of the communication device 16 based on the first and second measurement reports received from the communication device 16.

Each network node 12, 13 of the wireless network 10 may comprise means for determining the node specific calibration offset, $E_1$, for another network node 14 to be the difference between the beam forming gain of the receiver beamformer 63 and the beam forming gain of the communication device 16.

Each network node 12, 13 of the wireless network 10 may comprise means for using a determined node specific calibration offset $E_1$ for correcting measurement values received from another network node 13.

Each network node 12, 13 of the wireless network 10 may comprise means for:
estimating a first measurement value based on uplink reference signals received from the communication device 16,
estimating a second measurement value based on measurement reports from the communication device 16, the measurement reports comprising measurement values on downlink reference signals, and
determining the node specific calibration offset, $E_i$, for the network node 12, 13 to be the difference between a first measurement value of the first measurement report and a corresponding second measurement value of the second measurement report.

Each network node 12, 13 of the wireless network 10 may comprise means for sending the node specific calibration offset, $E_i$, to one or more network nodes.

Each network node 12, 13 of the wireless network 10 may comprise means for repeating, for one or more communication devices, the estimating of a first measurement value and a second measurement value and the determining, and wherein the obtained differences between the first and second measurement values are filtered or averaged.

Each network node 12, 13 of the wireless network 10 may comprise means for:
estimating a post-handover rate for the communication device 16, for handovers made after handover from a first network node 12, and calculating the difference between the estimated post-handover rate with a reported post-handover rate for the communication device 16, and
determining the node specific calibration offset, $E_1$, for the network node 12 to be an average or filtering of the calculated differences for two or more communication devices 16.

Each network node 12, 13 of the wireless network 10 may comprise means for:
determining a first difference to be the difference between measurements on uplink reference signals from a communication device 16 as received in two cells,
determining a second difference to be the difference in a first and second downlink measurement report received from the communication device 16, the first downlink measurement report being based on reference signals transmitted in the first cell, and a second downlink measurement report being based on reference signals transmitted in the second cell,
determining the node specific calibration offset, $E_i$, for the network node 12, 13, 14 to be the sum of the first difference and the second difference.

Each network node 12, 13 of the wireless network 10 may comprise means for:
receiving a respective node specific offset $E_i$ from one or more network nodes 13, 14,
calculating based on the received node specific offsets $E_i$ an average offset $E_{avg}$, and
updating the determined node specific offset $E_i$ for the network nodes 12, 13 with the average offset $E_{avg}$, by sending the calculated average offset $E_{avg}$ to the one or more network nodes 13, 14.

Each network node 12, 13 of the wireless network 10 may comprise means for:
determining the node specific calibration offset, for each of its neighboring network nodes 12, 13, 14, or
receiving, from a core network node, the node specific calibration offsets, $E_i$, for all of the two or more network nodes 12, 13, 14 or
determining the node specific calibration offset, $E_i$, for itself and receiving from each of its neighboring network node 12, 13, 14 their respective node specific calibration offset, $E_i$.

Figure 8:
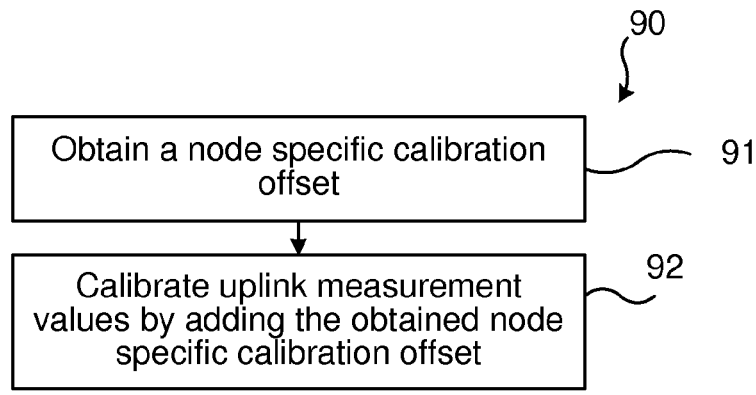
FIG. 8 illustrates a flow chart over steps of a method in a network node in accordance with the present disclosure.

FIG. 8 illustrates a flow chart over steps of a method performed in a first network node in accordance with the present disclosure. The method 90 for calibrating uplink measurements may be performed in a first network node 12 of a wireless network 10 comprising two or more network nodes 12, 13, 14 providing wireless communication for communication devices 16. The method 90 comprises obtaining 91 a node specific calibration offset, $E_i$. The obtaining 91 may for example comprise receiving the node specific calibrations offsets from a respective node, or calculating the node specific calibrations offsets for each respective node.

The method 90 comprises calibrating 92 uplink measurement values by adding the obtained node specific calibration offset, $E_i$. If for example, the first network node 12 obtains a node specific calibration offset for itself, it may calibrate its uplink measurement values of measurements made on uplink signaling from a communication device 16 by adding this node specific calibrations offset to them. The first network node 12 may also calibrate uplink measurement values of an uplink measurement report received from a second network node 13. By using the obtained node specific calibration offset(s) the first network node 12 may correct uplink measurement reports received from another node and/or correct its own uplink measurements.

In an embodiment, the method 90 wherein the obtaining 91 comprises obtaining a node specific calibration offset, $E_2$, for a second network node 13, and wherein the calibrating 92 comprises calibrating uplink measurement values of uplink measurement reports received from the second network node 13 by adding to the uplink measurement values the obtained node specific calibration offset, $E_2$, for the at least a second network node 13.

In an embodiment, the obtaining 91 a node specific calibration offset, $E_1$, is calculated based on one or more of: downlink measurement reports received from one or more communication devices 16, uplink measurements in the first network node 12 on reference signals from one or more communication devices 16, post-handover user performance related to a particular communication device in a target network node 13, 14 and handover events within a time period after an initial handover of a communication device 16.

In an embodiment, the obtaining 91 comprises:
receiving, from a second network node 13, a first measurement report, the first measurement report reporting on uplink reference signals from a communication device 16 as received by using a receiver beamformer 63 adapted for the communication device 16,
receiving, from the second network node 13, a second measurement report, the second measurement report reporting on the uplink reference signals from the communication device 16 as received by using the receiver beamformer 63 with common beamformer,
receiving, from the communication device 16, a third measurement report based on dedicated reference signals sent from the second network node 13,
receiving, from the communication device 16, a fourth measurement report from the communication device 16 based on common reference signals sent from the second network node 13,
determining a beam forming gain for the second network node 13 based on the first and second measurement reports,
determining a corresponding beam forming gain for the communication device 16 based on the third and fourth measurement reports, and
determining a node specific calibration offset, $E_2$, for the second network node 13 to be the difference between the beam forming gain of the receiver beamformer 63 and the beam forming gain of the communication device 16.

In a variation of the above embodiment, the method 90 comprises correcting measurement values of uplink measurement reports received from the second network node 13 by using the determined node specific calibration offset $E_2$ for the second network node 13.

In an embodiment, the obtaining 91 comprises:
estimating a first measurement value based on uplink reference signals received from the communication device 16,
estimating a second measurement value based on measurement reports from the communication device 16 comprising measurement values on downlink reference signals, and
determining the node specific calibration offset, $E_1$, for the first network node 12 to be the difference between a first measurement value of the first measurement report and a corresponding second measurement value of the second measurement report.

In a variation of the above embodiment, the method 90 comprises sending the node specific calibration offset, $E_1$, to one or more network nodes 13, 14.

In variations of the above two embodiment, the method 90 comprises repeating, for one or more communication devices, the estimating of a first measurement value and a second measurement value and the determining, and wherein the obtained differences between the first and second measurement values are filtered or averaged.

In an embodiment, the obtaining 91 comprises:
estimating a post-handover rate for the communication device 16 for handovers made after handover from the first network node 12, and calculating the difference between the estimated post-handover rate with a reported post-handover rate for the communication device 16, and
determining the node specific calibration offset, $E_1$, for the first network node 12 to be an average or filtering of the calculated differences for two or more communication devices 16.

In an embodiment, the obtaining 91 comprises:
determining a first difference to be the difference between measurements on uplink reference signals from a communication device 16 as received in two cells,
determining a second difference to be the difference in a first and second downlink measurement report received from the communication device 16, the first downlink measurement report being based on reference signals transmitted in the first cell, and a second downlink measurement report being based on reference signals transmitted in the second cell, determining the node specific calibration offset, $E_1$, for the first network node 12 to be the sum of the first difference and the second difference.

In an embodiment, the method comprises:
receiving the respective node specific offset $E_i$ from the respective one or more of the remaining network nodes 13, 14, and
calculating based on the received node specific offsets $E_i$ an average offset $E_{avg}$, and
sending, to the one or more remaining network nodes 13, 14 an updated node specific offset $E_i$ for the one or more remaining network nodes 13, 14 comprising the calculated average offset $E_{avg}$.

In an embodiment, the obtaining 91 comprises obtaining a respective node specific offset E for one or more of the remaining network nodes 13, 14 by:
determining the node specific calibration offset, $E_i$, for each of its neighboring network nodes 12, 13, 14, or
receiving, from a core network node, the node specific calibration offsets, $E_i$, or
determining the node specific calibration offset, $E_i$, for itself and receiving from each of its neighboring network node 12, 13, 14 their respective node specific calibration offset, $E_i$.

The first network node 12 may additionally be configured to perform the method 50 as described in relation to FIG. 5, and comprise the means, components and devices as described in relation to FIG. 6 for performing also the method 90 as described in relation to FIG. 8.

In an aspect, a first network node 12 is provided for calibrating uplink measurements, the first network node 12 configured to provide wireless communication for communication devices 16 of a wireless network 10. The first network node is configured to obtain a node specific calibration offset, $E_i$, and calibrate uplink measurement values by adding the obtained node specific calibration offset, $E_i$. The first network node 12 may for example be configured to perform the steps by comprising a processor 60 and memory 61, the memory 61 containing instructions executable by the processor 60, whereby the first network node 12 is operative to perform the obtaining and calibrating.

In an embodiment, the first network node 12 is configured to:
obtain by obtaining a node specific calibration offset, $E_2$, for a second network node 13, and configured to calibrate by
calibrating uplink measurement values of uplink measurement reports from the second network node 13 by adding to the uplink measurement values the obtained node specific calibration offset, $E_2$, for the second network node 13.

In an embodiment, the first network node 12 is configured to obtain a node specific calibration offset, $E_1$, by performing calculations based on one or more of: downlink measurement reports received from one or more communication devices 16, uplink measurements in the first network node 12 on reference signals from one or more communication devices 16, post-handover user performance related to a particular communication device in a target network node 13, 14 and handover events within a time period after an initial handover of a communication device 16.

In an embodiment, the first network node 12 is configured to obtain by:
receiving, from a second network node 13, a first measurement report, the first measurement report reporting on uplink reference signals from a communication device 16 as received by using a receiver beamformer 63 adapted for the communication device 16,
receiving, from the second network node 13, a second measurement report, the second measurement report reporting on the uplink reference signals from the communication device 16 as received by using the receiver beamformer 63 with common beamformer,
receiving, from the communication device 16, a third measurement report based on dedicated reference signals sent from the second network node 13,
receiving, from the communication device 16, a fourth measurement report from the communication device 16 based on common reference signals sent from the second network node 13,
determining a beam forming gain for the second network node 13 based on the first and second measurement reports,
determining a corresponding beam forming gain for the communication device 16 based on the third and fourth measurement reports, and
determining a node specific calibration offset, $E_2$, for the second network node 13 to be the difference between the beam forming gain of the receiver beamformer 63 and the beam forming gain of the communication device 16.

In an embodiment, the first network node 12 is configured to correct measurement values of uplink measurement reports received from the second network node 13 by using the determined node specific calibration offset $E_2$ for the second network node 13.

In an embodiment, the first network node 12 is configured to obtain by:
estimating a first measurement value based on uplink reference signals received from the communication device 16,
estimating a second measurement value based on measurement reports from the communication device 16 comprising measurement values on downlink reference signals, and
determining the node specific calibration offset, $E_1$, for the first network node 12 to be the difference between a first measurement value of the first measurement report and a corresponding second measurement value of the second measurement report.

In a variation of the above embodiment, the first network node 12 is configured to send the node specific calibration offset, $E_1$, to one or more network nodes 13, 14.

In variations of the above two embodiments, the first network node 12 is configured to repeat, for one or more communication devices, the estimating of a first measurement value and a second measurement value and the determining, and wherein the obtained differences between the first and second measurement values are filtered or averaged.

In an embodiment, the first network node 12 is configured to obtain by:
estimating a post-handover rate for the communication device 16 for handovers made after handover from the first network node 12, and calculating the difference between the estimated post-handover rate with a reported post-handover rate for the communication device 16, and
determining the node specific calibration offset, $E_1$, for the first network node 12 to be an average or filtering of the calculated differences for two or more communication devices 16.

In an embodiment, the first network node 12 is configured to obtain by:

determining a first difference to be the difference between measurements on uplink reference signals from a communication device 16 as received in two cells, determining a second difference to be the difference in a first and second downlink measurement report received from the communication device 16, the first downlink measurement report being based on reference signals transmitted in the first cell, and a second downlink measurement report being based on reference signals transmitted in the second cell, determining the node specific calibration offset, $E_1$, for the first network node 12 to be the sum of the first difference and the second difference.

In an embodiment, the first network node 12 is configured to:

receive the respective node specific offset $E_i$ from the respective one or more of the remaining network nodes 13, 14, and calculate based on the received node specific offsets $E_i$ an average offset $E_{avg}$, and send, to the one or more remaining network nodes 13, 14 an updated node specific offset $E_i$ for the one or more remaining network nodes 13, 14 comprising the calculated average offset $E_{avg}$.

In an embodiment, the first network node 12 is configured to obtain by obtaining a respective node specific offset $E_i$ for one or more of the remaining network nodes 13, 14 by:

determining the node specific calibration offset, $E_i$, for each of its neighboring network nodes 12, 13, 14, or receiving, from a core network node, the node specific calibration offsets, $E_i$, or determining the node specific calibration offset, $E_i$, for itself and receiving from each of its neighboring network node 12, 13, 14 their respective node specific calibration offset, $E_i$.

The present disclosure also encompasses computer program 67 comprising computer program code for causing a first network node 12 to perform the method as described herein, e.g. as described above in relation to FIG. 8 when the computer program code is executed on at least one processor 60 of the first network node 12.

The present disclosure also encompasses a computer program product 68 comprising a computer program 67 as described above, and a computer readable means on which the computer program 67 is stored.

Figure 9:
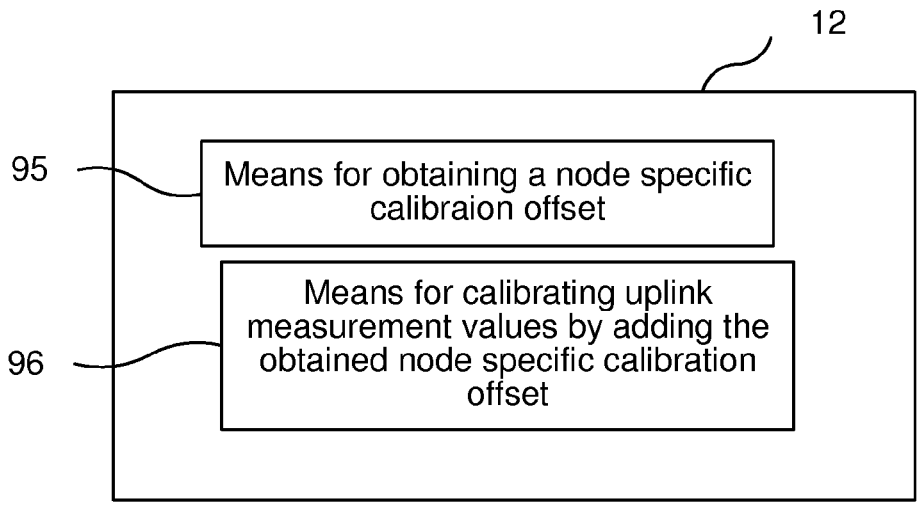
FIG. 9 illustrates a network node comprising function modules/software modules for implementing methods of the present disclosure.

An example of an implementation using function modules/software modules is illustrated in FIG. 9, in particular illustrating a first network node 12 comprising function modules and/or software modules for implementing embodiments of the method 90.

The first network node 12 may comprise first means 95, for example a first function module, for obtaining a node specific calibration offset, $E_1$. Such means may for example comprise processing circuitry configured to receive a node specific calibration offset, $E_1$ via an interface device.

The first network node 12 may comprise second means 96, for example a second function module for calibrating uplink measurement values by adding the obtained node specific calibration offset, $E_i$. Such means may for example comprise processing circuitry, adapted to calibrate uplink measurements by adding the obtained node specific calibration offset, $E_i$ to the uplink measurement, by using program code stored in memory, respectively.

The first network node 12 may comprise yet additional means for performing the steps of the various embodiments of the method 90. For example, the first network node 12 may comprise means for obtaining a node specific calibration offset, $E_2$, for a second network node 13, and calibrating uplink measurement values of uplink measurement reports received from the second network node 13 by adding to the uplink measurement values the obtained node specific calibration offset, $E_2$, for the at least a second network node 13.

The first network node 12 may comprise means for obtaining a node specific calibration offset, $E_1$, by calculations based on one or more of: downlink measurement reports received from one or more communication devices 16, uplink measurements in the first network node 12 on reference signals from one or more communication devices 16, post-handover user performance related to a particular communication device in a target network node 13, 14 and handover events within a time period after an initial handover of a communication device 16.

The first network node 12 may comprise means for obtaining by:

receiving, from a second network node 13, a first measurement report, the first measurement report reporting on uplink reference signals from a communication device 16 as received by using a receiver beamformer 63 adapted for the communication device 16, receiving, from the second network node 13, a second measurement report, the second measurement report reporting on the uplink reference signals from the communication device 16 as received by using the receiver beamformer 63 with common beamformer, receiving, from the communication device 16, a third measurement report based on dedicated reference signals sent from the second network node 13, receiving, from the communication device 16, a fourth measurement report from the communication device 16 based on common reference signals sent from the second network node 13, determining a beam forming gain for the second network node 13 based on the first and second measurement reports, determining a corresponding beam forming gain for the communication device 16 based on the third and fourth measurement reports, and determining a node specific calibration offset, $E_2$, for the second network node 13 to be the difference between the beam forming gain of the receiver beamformer 63 and the beam forming gain of the communication device 16.

Such means may comprise various processing circuitry, e.g. processing circuitry, adapted to perform the various functions, by using program code stored in memory, and/or processing circuitry for transmitting and/or processing circuitry for receiving.

The first network node 12 may comprise means for correcting measurement values of uplink measurement reports received from the second network node 13 by using the determined node specific calibration offset $E_2$ for the second network node 13.

The first network node 12 may comprise means for obtaining by:

estimating a first measurement value based on uplink reference signals received from the communication device 16, estimating a second measurement value based on measurement reports from the communication device 16 comprising measurement values on downlink reference signals, and determining the node specific calibration offset, $E_1$, for the first network node 12 to be the difference between a first measurement value of the first measurement report and a corresponding second measurement value of the second measurement report.

Such means may again comprise various processing circuitry, e.g. processing circuitry, adapted to perform the various functions, e.g. estimating and determining, by using program code stored in memory, and/or processing circuitry for transmitting and/or processing circuitry for receiving.

The first network node 12 may comprise means for sending the node specific calibration offset, $E_1$, to one or more network nodes 13, 14. Such means may for example comprise processing circuitry configured to transmit the request to the neighboring node 13, via an interface and cable.

The first network node 12 may comprise means for repeating, for one or more communication devices, the estimating of a first measurement value and a second measurement value and the determining, and wherein the obtained differences between the first and second measurement values are filtered or averaged.

The first network node 12 may comprise means for obtaining by:
- estimating a post-handover rate for the communication device 16 for handovers made after handover from the first network node 12, and calculating the difference between the estimated post-handover rate with a reported post-handover rate for the communication device 16, and
- determining the node specific calibration offset, $E_1$, for the first network node 12 to be an average or filtering of the calculated differences for two or more communication devices 16.

Such means may again comprise various processing circuitry, e.g. processing circuitry, adapted to perform the various functions, e.g. estimating and determining, using program code stored in memory.

The first network node 12 may comprise means for obtaining by:
- determining a first difference to be the difference between measurements on uplink reference signals from a communication device 16 as received in two cells,
- determining a second difference to be the difference in a first and second downlink measurement report received from the communication device 16, the first downlink measurement report being based on reference signals transmitted in the first cell, and a second downlink measurement report being based on reference signals transmitted in the second cell,
- determining the node specific calibration offset, $E_1$, for the first network node 12 to be the sum of the first difference and the second difference.

Such means may comprise various processing circuitry, e.g. processing circuitry, adapted to perform such determinations by using program code stored in memory.

The first network node 12 may comprise means for:
- receiving the respective node specific offset $E_i$ from the respective one or more of the remaining network nodes 13, 14, and
- calculating based on the received node specific offsets $E_i$ an average offset $E_{avg}$, and
- sending, to the one or more remaining network nodes 13, 14 an updated node specific offset $E_i$ for the one or more remaining network nodes 13, 14 comprising the calculated average offset $E_{avg}$.

Such means may comprise various processing circuitry, e.g. processing circuitry, adapted to calculate using program code stored in memory and/or processing circuitry for transmitting and/or processing circuitry for receiving.

The first network node 12 may comprise means for obtaining by obtaining a respective node specific offset $E_i$ for one or more of the remaining network nodes 13, 14 by:
- determining the node specific calibration offset, $E_i$, for each of its neighboring network nodes 12, 13, 14, or
- receiving, from a core network node, the node specific calibration offsets, $E_i$, or
- determining the node specific calibration offset, $E_i$, for itself and receiving from each of its neighboring network node 12, 13, 14 their respective node specific calibration offset, $E_i$.

Such means may comprise various processing circuitry, e.g. processing circuitry, adapted to determine by using program code stored in memory and/or processing circuitry for receiving.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for controlling handover of communication devices in a wireless network comprising two or more network nodes providing wireless communication for the communication devices, the method comprising:
   - obtaining a node specific calibration offset, $E_i$, for each of the two or more network nodes,
   - calibrating uplink measurements performed by each of the two or more network nodes for one of the communication devices, by adding to the uplink measurements made by the respective network node the respective node specific calibration offset, $E_i$,
   - comparing the calibrated uplink measurements between the two or more network nodes, for the communication device, and
   - controlling handover of the communication device between the two or more network nodes, based on said comparing of the calibrated uplink measurements.

2. The method as claimed in claim 1, wherein the obtaining comprises:
   - receiving, in a second one of the two or more network nodes, uplink reference signals from the communication device by using a receiver beamformer adapted for the communication device, and measuring of the received uplink reference signals providing a first measurement value,
   - receiving, in the second network node, the uplink reference signals from the communication device by using the receiver beamformer non-beamformed and thus not adapted for the communication device, and measuring of the received uplink reference signals, providing a second measurement value,
   - transmitting, to a first one of the two or more network nodes, the first and second measurement values,
   - receiving, in the first network node, a first measurement report from the communication device based on dedicated reference signals sent from the first network node,
   - receiving, in the first network node, a second measurement report from the communication device based on common reference signals sent from the first network node,
   - determining, in the first network node, a beam forming gain of the receiver beamformer based on the first and second measurement values,
   - determining, in the first network node, a corresponding beam forming gain of the communication device based on the first and second measurement reports received from the communication device, and determining, in the first network node, the node specific calibration offset, $E_1$, for the second network node to be the difference between the beam forming gain of the receiver beamformer and the beam forming gain of the communication device.

3. The method as claimed in claim 2, further comprising:
using, in the first network node, the determined node specific calibration offset $E_1$ for correcting measurement values received from the second network node.

4. The method as claimed in claim 1, wherein the obtaining comprises, for each of the two or more network nodes:
estimating, in a network node of the two or more network nodes, a first measurement value based on uplink reference signals received from the communication device, estimating, in the network node, a second measurement value based on measurement reports from the communication device, the measurement reports comprising measurement values on downlink reference signals, and determining, in the network node, the node specific calibration offset, $E_i$, for the network node to be the difference between a first measurement value of the first measurement report and a corresponding second measurement value of the second measurement report.

5. The method as claimed in claim 1, wherein the obtaining comprises:
estimating a post-handover rate for the communication device, for handovers made after handover from a first one of the two or more network nodes, and calculating the difference between the estimated post-handover rate with a reported post-handover rate for the communication device, and determining the node specific calibration offset, $E_1$, for the first network node to be an average or filtering of the calculated differences for two or more communication devices.

6. The method as claimed in claim 1, wherein the obtaining comprises:
determining a first difference to be the difference between measurements on uplink reference signals from the communication device as received in two cells, determining a second difference to be the difference in a first and second downlink measurement report received from the communication device, the first downlink measurement report being based on reference signals transmitted in the first cell, and a second downlink measurement report being based on reference signals transmitted in the second cell, determining the node specific calibration offset, $E_i$, for a network node, among the two or more network nodes, associated with at least one of the first and second cells to be the sum of the first difference and the second difference.

7. The method as claimed in claim 1, further comprising:
receiving, in a first one of the two or more network nodes, a respective node specific offset $E_i$ from one or more remaining ones of the two or more network nodes, and calculating, in the first network node, based on the received node specific offsets $E_i$ an average offset $E_{avg}$, and updating the determined node specific offset $E_i$ for the two or more network nodes with the average offset $E_{avg}$, by sending from the first network node the calculated average offset $E_{avg}$ to the one or more remaining network nodes.

8. The method as claimed in claim 1, wherein the method is performed in each one of the two or more network nodes that provides wireless communication for one or more of the communication devices, and wherein, for each such network node, the obtaining comprises:
determining the node specific calibration offset, $E_i$, for each neighboring network node, or receiving, from a core network node, the node specific calibration offsets, $E_i$, for all of the two or more network nodes or determining the node specific calibration offset, $E_i$, for the network node and receiving from each neighboring network node the respective node specific calibration offset, $E_i$.

9. A wireless network comprising two or more network nodes providing wireless communication for communication devices, the wireless network being configured to:
obtain a node specific calibration offset, $E_i$, for each of the two or more network nodes, and calibrate the uplink measurements performed by each of the two or more network nodes for one of the communication devices, by adding to the respective node specific calibration offset, $E_i$, to the uplink measurements made by the network node, compare the calibrated uplink measurements between the two or more network nodes, for the communication device, and control handover of the communication device between the two or more network nodes, based on said comparing of the calibrated uplink measurements.

10. The wireless network as claimed in claim 9, wherein the wireless network is configured to obtain the node specific calibration offsets based on being configured to:
receive, in a second one of the two or more network nodes, uplink reference signals from the communication device by using a receiver beamformer adapted for the communication device, and measure the received uplink reference signals to obtain a first measurement value, receive, in the second network node, the uplink reference signals from the communication device by using the receiver beamformer non-beamformed and thus not adapted for the communication device, and measure the received uplink reference signals, to obtain a second measurement value, transmit, to a first one of the two or more network nodes, the first and second measurement values, receive, in the first network node, a first measurement report from the communication device based on dedicated reference signals sent from the first network node, receive, in the first network node, a second measurement report from the communication device based on common reference signals sent from the first network node, determine, in the first network node, a beam forming gain of the receiver beamformer based on the first and second measurement values, determine, in the first network node, a corresponding beam forming gain of the communication device based on the first and second measurement reports received from the communication device, and determine, in the first network node, the node specific calibration offset, $E_1$, for the second network node to be the difference between the beam forming gain of the receiver beamformer and the beam forming gain of the communication device.

11. The wireless network as claimed in claim 9, wherein the wireless network is configured to obtain the node specific calibration offsets for each of the two or more network nodes, based on being configured to:
estimate, in a network node of the two or more network nodes, a first measurement value based on uplink reference signals received from the communication device,
estimate, in the network node, a second measurement value based on measurement reports from the communication device, the measurement reports comprising measurement values on downlink reference signals, and
determine, in the network node, the node specific calibration offset, $E_i$, for the network node to be the difference between a first measurement value of the first measurement report and a corresponding second measurement value of the second measurement report.

12. The wireless network as claimed in claim 9, wherein the wireless network is configured to obtain the node specific calibration offsets based on being configured to:
estimate a post-handover rate for the communication device, for handovers made after handover from a first one of the two or more network nodes, and calculate the difference between the estimated post-handover rate with a reported post-handover rate for the communication device, and
determine the node specific calibration offset, $E_i$, for the first network node to be an average or filtering of the calculated differences for two or more communication devices.

13. The wireless network as claimed in claim 12, wherein the first network node is configured to:
determine the node specific calibration offset, $E_i$, for neighboring network node, or
receive, from a core network node, the node specific calibration offsets, $E_i$, for all of the two or more network nodes or
determine the node specific calibration offset, $E_i$, for the first network node and receive from each neighboring network node the respective node specific calibration offset, $E_i$.

14. The wireless network as claimed in claim 9, wherein the wireless network is configured to obtain the node specific calibration offsets based on being configured to:
determine a first difference to be the difference between measurements on uplink reference signals from the communication device as received in two cells,
determine a second difference to be the difference in a first and second downlink measurement report received from the communication device, the first downlink measurement report being based on reference signals transmitted in a first one of the two cell, and a second downlink measurement report being based on reference signals transmitted in a second one of the two cells, and
determine the node specific calibration offset, $E_i$, for a network node, among the two or more network nodes, associated with at least one of the first and second cells to be the sum of the first difference and the second difference.

15. A method performed in a first one of two or more network nodes of a wireless network, the method comprising:
obtaining a node specific calibration offset, $E_1$,
calibrating uplink measurements made for a communication device operating in the wireless network, by adding the obtained node specific calibration offset, $E_1$, and performing one of:
controlling handover of the communication device towards a second one of the two or more network nodes, based on the calibrated uplink measurements; or
providing the calibrated uplink measurements to the second network node, for use by the second network node in controlling handover of the communication device towards the first network node.

16. The method as claimed in claim 15, wherein the obtaining comprises obtaining a node specific calibration offset, $E_2$, for the second network node, and wherein the calibrating comprises calibrating the uplink measurements received from the second network node by adding to the uplink measurements the obtained node specific calibration offset, $E_2$, for the second network node.

17. The method as claimed in claim 15, wherein the obtaining comprises:
receiving, from the second network node, a first measurement report, the first measurement report reporting on uplink reference signals from the communication device as received by using a receiver beamformer adapted for the communication device,
receiving, from the second network node, a second measurement report, the second measurement report reporting on the uplink reference signals from the communication device as received by using the receiver beamformer with common beamformer,
receiving, from the communication device, a third measurement report based on dedicated reference signals sent from the second network node,
receiving, from the communication device, a fourth measurement report from the communication device based on common reference signals sent from the second network node,
determining a beam forming gain for the second network node based on the first and second measurement reports,
determining a corresponding beam forming gain for the communication device based on the third and fourth measurement reports, and
determining a node specific calibration offset, $E_2$, for the second network node to be the difference between the beam forming gain of the receiver beamformer and the beam forming gain of the communication device.

18. The method as claimed in claim 17, further comprising:
correcting measurement values of uplink measurements received from the second network node for the communication device by using the determined node specific calibration offset $E_2$ for the second network node.

19. The method as claimed in claim 15, wherein the obtaining comprises:
estimating a first measurement value based on uplink reference signals received from the communication device,
estimating a second measurement value based on measurement reports from the communication device comprising measurement values on downlink reference signals, and determining the node specific calibration offset, $E_1$, for the first network node to be the difference between a first measurement value of the first measurement report and a corresponding second measurement value of the second measurement report.

20. The method as claimed in claim 15, wherein the obtaining comprises:
estimating a post-handover rate for the communication device for handovers made after handover from the first network node, and calculating the difference between the estimated post-handover rate with a reported post-handover rate for the communication device, and
determining the node specific calibration offset, $E_1$, for the first network node to be an average or filtering of the calculated differences for two or more communication devices.

21. The method as claimed in claim 15, wherein the obtaining comprises:
determining a first difference to be the difference between measurements on uplink reference signals from the communication device as received in two cells,
determining a second difference to be the difference in a first and second downlink measurement report received from the communication device, the first downlink measurement report being based on reference signals transmitted in the first cell, and a second downlink measurement report being based on reference signals transmitted in the second cell,
determining the node specific calibration offset, $E_1$, for the first node, to be the sum of the first difference and the second difference.

22. The method as claimed in claim 15, wherein the obtaining comprises obtaining a respective node specific offset $E_i$ for one or more remaining ones of the two or more network nodes by:
determining the node specific calibration offset, $E_i$, for each neighboring network nodes, or
receiving, from a core network node, the node specific calibration offsets, $E_i$, or
determining the node specific calibration offset, $E_i$, for the first network node and receiving from each neighboring network node the respective node specific calibration offset, $E_i$.

23. A first network node configured for operation in a wireless network, the first network node comprising:
communication circuitry configured for communicating with a second network node in the wireless network;
processing circuitry operatively associated with the communication circuitry and configured to:
obtain a node specific calibration offset, $E_1$, and
calibrate uplink measurements made for a communication device operating in the wireless network, by adding the obtained node specific calibration offset, $E_1$, and
perform one of:
control handover of the communication device towards the second network node, based on the calibrated uplink measurements; or
provide the calibrated uplink measurements to the second network node, for use by the second network node in controlling handover of the communication device towards the first network node.

24. The first network node as claimed in claim 23, wherein the first network node is configured to obtain the node specific calibration offset, $E_1$ based on being configured to obtain a node specific calibration offset, $E_2$, for the second network node, and wherein the first network node is configured to calibrate the uplink measurements based on being configured to calibrate uplink measurements received from the second network node for the communication device, by adding to the received uplink measurements the obtained node specific calibration offset, $E_2$, for the second network node.

25. The first network node as claimed in claim 23, wherein the first network node is configured to obtain the node specific calibration offset, $E_1$, based on being configured to:
receive, from the second network node, a first measurement report, the first measurement report reporting on uplink reference signals from the communication device as received by using a receiver beamformer adapted for the communication device,
receive, from the second network node, a second measurement report, the second measurement report reporting on the uplink reference signals from the communication device as received by using the receiver beamformer with common beamformer,
receive, from the communication device, a third measurement report based on dedicated reference signals sent from the second network node,
receive, from the communication device, a fourth measurement report from the communication device based on common reference signals sent from the second network node,
determine a beam forming gain for the second network node based on the first and second measurement reports,
determine a corresponding beam forming gain for the communication device based on the third and fourth measurement reports, and
determine a node specific calibration offset, $E_2$, for the second network node to be the difference between the beam forming gain of the receiver beamformer and the beam forming gain of the communication device.

26. The first network node as claimed in claim 25, wherein the first network node is further configured to:
correct uplink measurements received from the second network node for the communication device, by using the determined node specific calibration offset, $E_2$, for the second network node.

27. The first network node as claimed in claim 23, wherein the first network node is configured to obtain the node specific calibration offset, $E_1$, based on being configured to:
estimate a first measurement value based on uplink reference signals received from the communication device,
estimate a second measurement value based on measurement reports from the communication device comprising measurement values on downlink reference signals, and
determining the node specific calibration offset, $E_1$, for the first node to be the difference between a first measurement value of the first measurement report and a corresponding second measurement value of the second measurement report.

28. The first network node as claimed in claim 23, wherein the first network node is configured to obtain the node specific calibration offset, $E_1$, based on being configured to:
estimate a post-handover rate for the communication device for handovers made after handover from the first network node, and calculating the difference between the estimated post-handover rate with a reported post-handover rate for the communication device, and determine the node specific calibration offset, $E_1$, for the first network node to be an average or filtering of the calculated differences for two or more communication devices.

29. The first network node as claimed in claim 23, wherein the first network node is configured to obtain the node specific calibration offset, $E_1$, based on being configured to:

determine a first difference to be the difference between measurements on uplink reference signals from the communication device as received in two cells, determine a second difference to be the difference in a first and second downlink measurement report received from the communication device, the first downlink measurement report being based on reference signals transmitted in the first cell, and a second downlink measurement report being based on reference signals transmitted in the second cell, determine the node specific calibration offset, $E_1$, for the first network node to be the sum of the first difference and the second difference.

30. The first network node as claimed in claim 23, wherein the first network node is configured to obtain the node specific calibration offset, $E_1$, based on being configured to:

obtain a respective node specific offset, $E_i$, for one or more of other network nodes neighboring the first network node, including the second network node, based on:

determining the node specific calibration offset, $E_i$, for each of the one or more neighboring network nodes, or receiving, from a core network node, the node specific calibration offsets, $E_i$, or determining the node specific calibration offset, $E_i$, for the first network node and receiving from the neighboring network node the respective node specific calibration offset, $E_i$.

31. A non-transitory computer-readable medium storing a computer program for a first network node that is configured for operation in a wireless network, the computer program comprising computer program instructions, which, when executed by a processor on the first network node, cause the first network node to control handover of a communication device operating in the network, the computer program comprising program instructions causing the first network node to:

obtain a node specific calibration offset, $E_1$, and calibrate uplink measurements made for the communication device by adding the obtained node specific calibration offset, $E_1$, perform one of:

control handover of the communication device towards a second network node in the wireless network, based on the calibrated uplink measurements; or provide the calibrated uplink measurements to the second network node, for use by the second network node in controlling handover of the communication device towards the first network node.

* * * * *